(No Model.) 6 Sheets—Sheet 1.

T. B. HEATHORN.
STEERING APPARATUS.

No. 246,134. Patented Aug. 23, 1881.

WITNESSES.
J M Pollard
Robert Everett

INVENTOR.
Thomas B. Heathorn.
by James L. Norris.
Atty.

(No Model.) 6 Sheets—Sheet 2.

T. B. HEATHORN.
STEERING APPARATUS.

No. 246,134. Patented Aug. 23, 1881.

WITNESSES.
J. M. Pollard
Robert Everett

INVENTOR.
Thomas B. Heathorn.
by James L. Norris,
Atty.

(No Model.) 6 Sheets—Sheet 3.
T. B. HEATHORN.
STEERING APPARATUS.
No. 246,134. Patented Aug. 23, 1881.
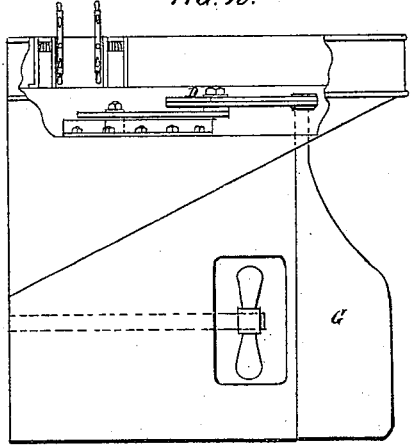
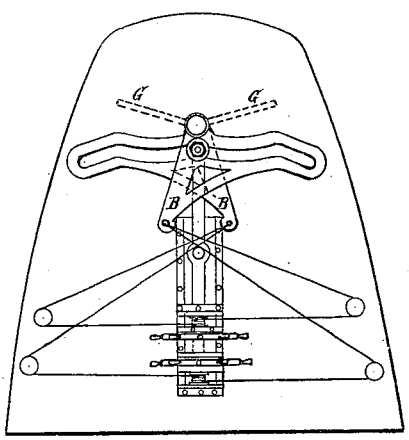
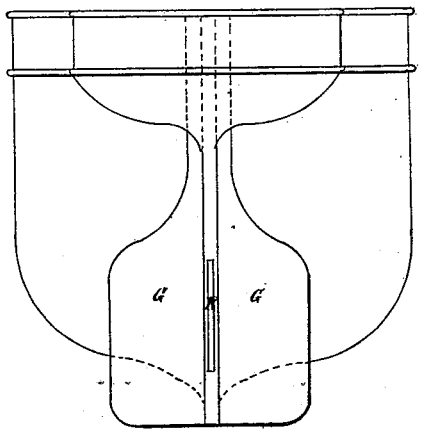
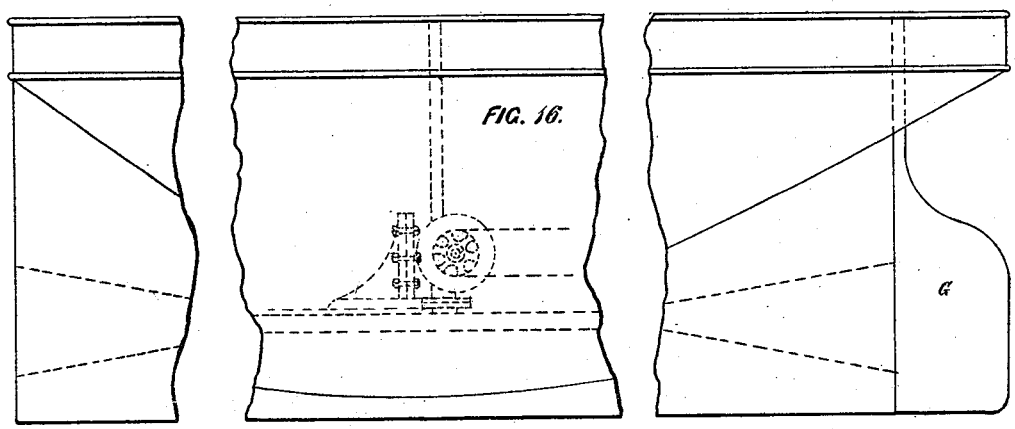
WITNESSES. INVENTOR.
Thomas B. Heathorn.
by James L. Norris.
Atty

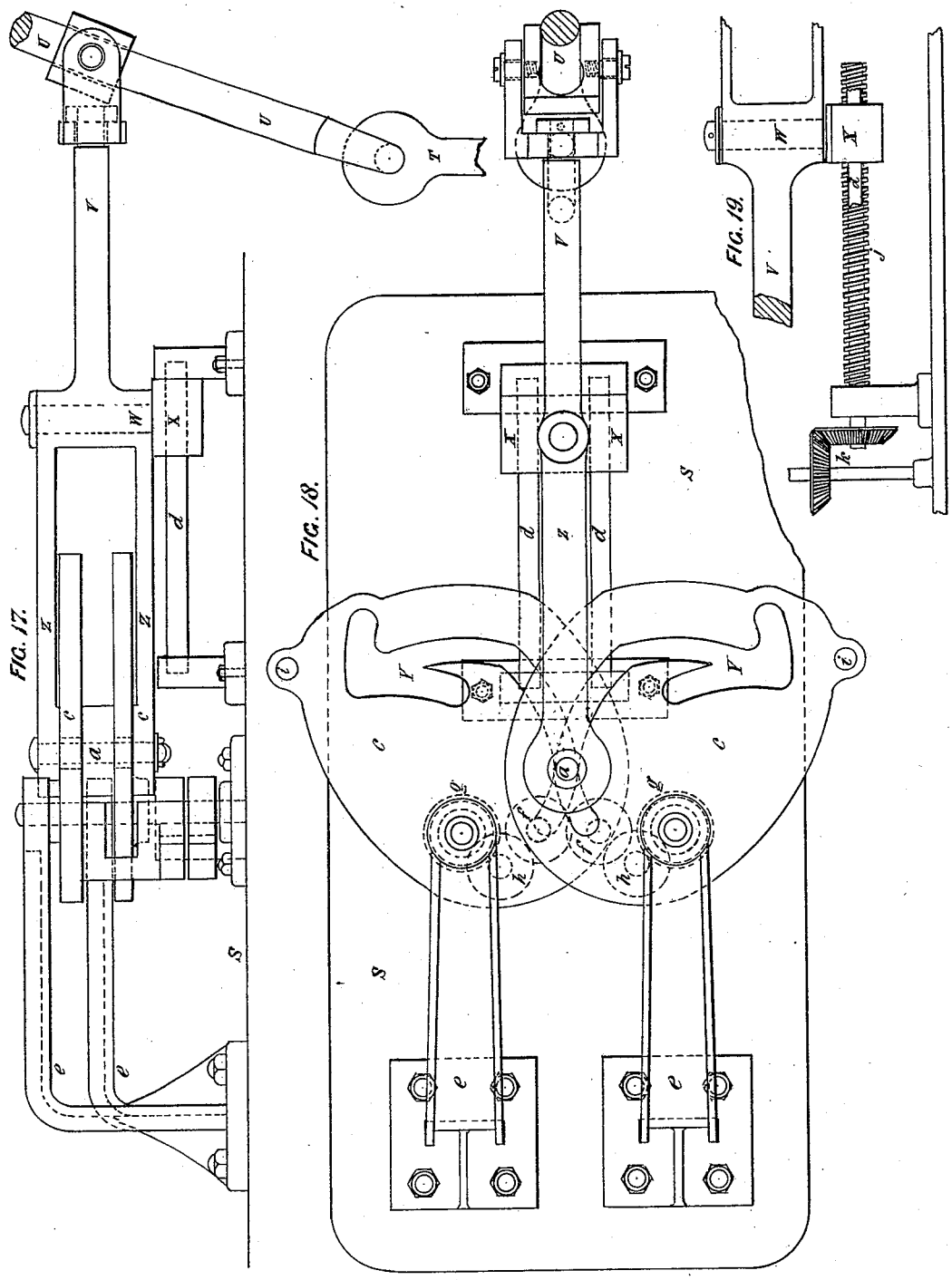

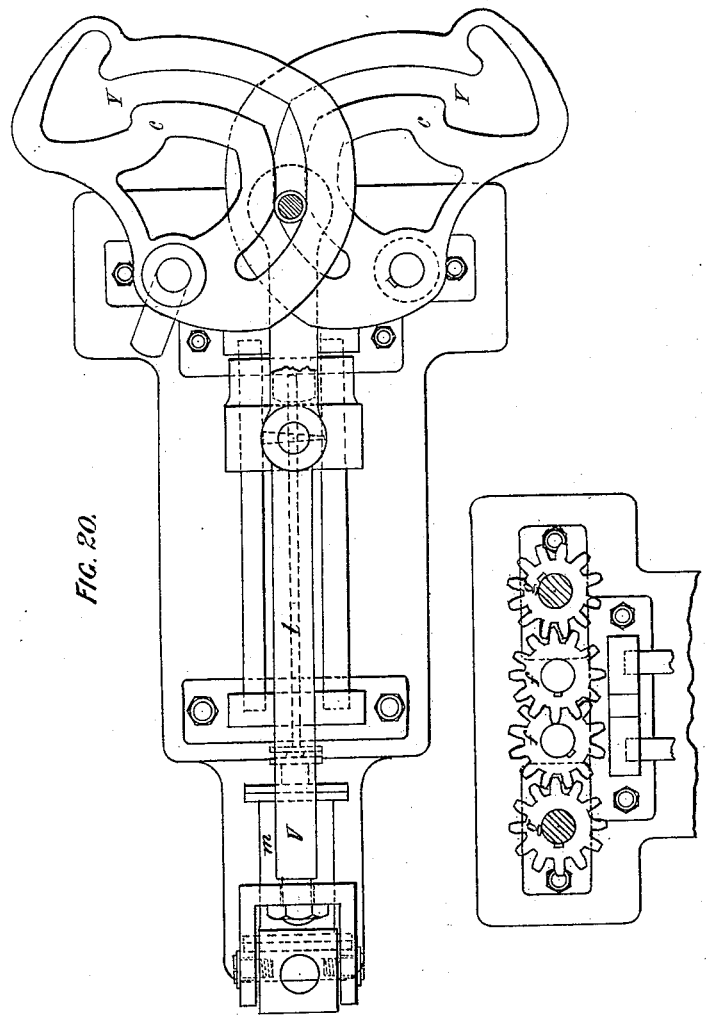

(No Model.) 6 Sheets—Sheet 6.
T. B. HEATHORN.
STEERING APPARATUS.
No. 246,134. Patented Aug. 23, 1881.
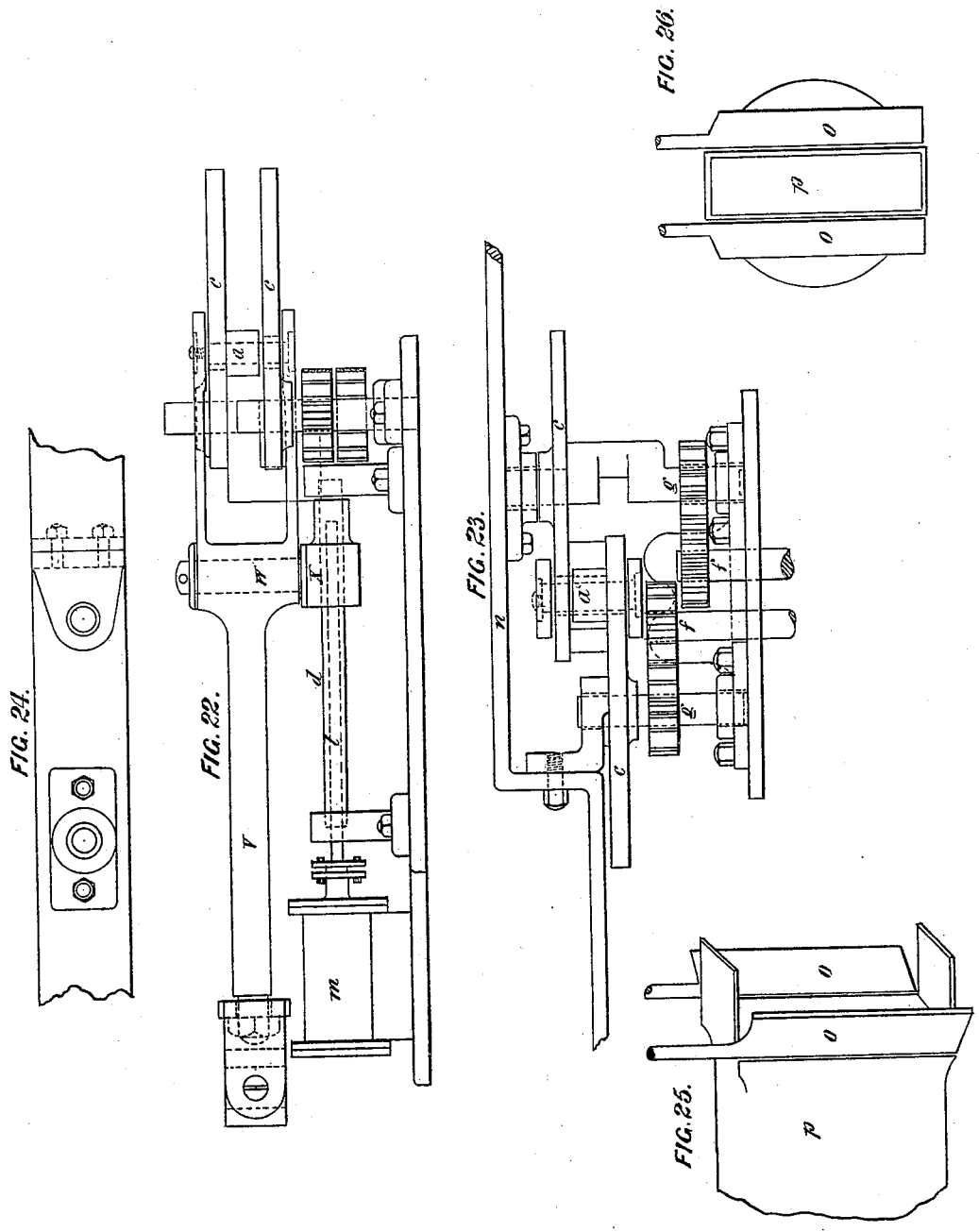
WITNESSES.
INVENTOR.
Thomas B. Heathorn.
by James L. Norris.
Atty.

UNITED STATES PATENT OFFICE.

THOMAS B. HEATHORN, OF LONDON, ENGLAND.

STEERING APPARATUS.

SPECIFICATION forming part of Letters Patent No. 246,134, dated August 23, 1881.

Application filed January 20, 1881. (No model.) Patented in England May 26, 1879, in France October 22, 1879, in Belgium October 29, 1879, and in England June 7, 1880.

*To all whom it may concern:*

Be it known that I, THOMAS BRIDGES HEATHORN, of London, England, have invented new and useful Improvements in Apparatus for Steering Ships, Vessels, and Boats, and for Checking their Speed, (for which I have obtained two patents in Great Britain, the one being No. 2,082, bearing date May 26, 1879, and the other No. 2,298, bearing date June 7, 1880, and one patent in France, No. 133,304, dated October 22, 1879, and one patent in Belgium, No. 49,690, B, dated October 29, 1879,) of which the following is a specification, reference being had to the accompanying drawings.

This invention has for its object the steering and checking the speed of ships, vessels, or boats in a more efficient manner than has hitherto been achieved, and relates in the first place to means for steering and checking speed while going ahead, and in the second place to steering and checking speed while going ahead or astern.

In the first place the invention, as it relates to the steering and checking of speed while going ahead, consists in providing the ship with two rudders, placed either close together or at some distance from each other. To the top of the rudder-posts are fixed two curved and slotted arms, and through these slots a vertical arm or stud is free to travel. This stud or arm is fixed to one end of the tiller, which is pivoted at or near its center to a traveling nut worked by a horizontal screw. The opposite end of the tiller on being moved to either one side or the other causes the stud or vertical arm to press against the sides of the slots in the arms, and so change the position of the rudders to starboard or larboard, as the case may be.

In order to retard the motion of the vessel, the screw before referred to is made to revolve, whereby the position of the nut in relation to the slotted arms is changed, and the change so effected causes the rudders to diverge to such an extent as to offer great impediment to the continuance of the ship's course.

For boat's use, the arms fixed to the rudder-posts may be worked by yoke-lines, as usual.

In order that the foregoing may be more easily understood, drawings are attached hereto, of which the following is a description.

Figure 1 is a plan of the stern of a vessel, where the screw-propeller A is placed abaft the rudders which lie close up to the keel when not acted upon by either of the slotted arms B B, one of which is fixed to the top of each rudder-post. The shaft C is arranged so that it can be drawn forward or thrust aft either by manual, steam, or other suitable power. When placed in the position shown the starboard rudder can be turned to starboard, or the larboard rudder to larboard. If the shaft is drawn forward, the rudders become locked by the stud D taking into the recess E, and can move neither way; but if the shaft is thrust farther aft, as is shown in Fig. 3, the rudders shown in dotted lines will be made to diverge in proportion to the extent of the thrust, and when so operated upon will check the passage of the vessel. Ropes or chains are fixed to the ends F F of the arms B B, and are carried around suitable sheaves to the shaft of the steering-wheel.

Fig. 2 is a side elevation of Fig. 1, a part of the bulwarks being removed to show the disposition of the levers and shaft, G being the rudder.

Fig. 4 exhibits an arrangement of double rudders for rowing-boats, sailing-craft, or vessels with twin screws. In the plan the arms B B drawn in full lines indicate their position and that of the rudders G G when closed, while the dotted lines demonstrate the position they assume when the rudders are drawn to one side.

Fig. 5 is an elevation of Fig. 4, and Fig. 6 is a plan like that of Fig. 4 with the shaft C thrust to its extremity, so that the rudders G G diverge. The handle H when pulled to the forward extremity locks the rudders, but when thrust to the after extremity operates as in Fig. 6. An intermediate position of the handle admits of both rudders being used for steering in the ordinary way.

Figure 1:
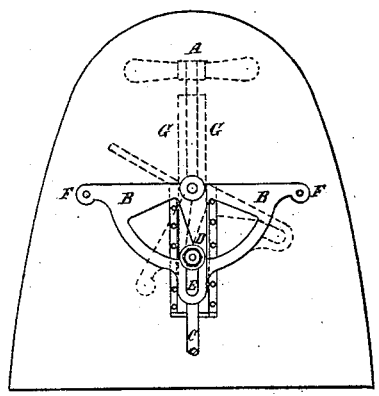
Figure 2:
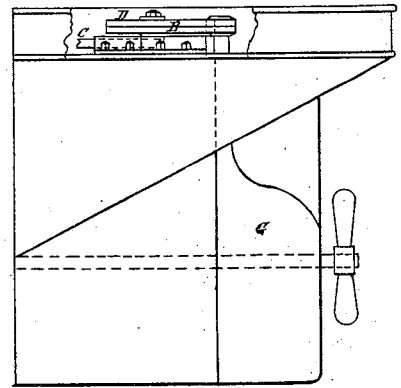
Figure 3:
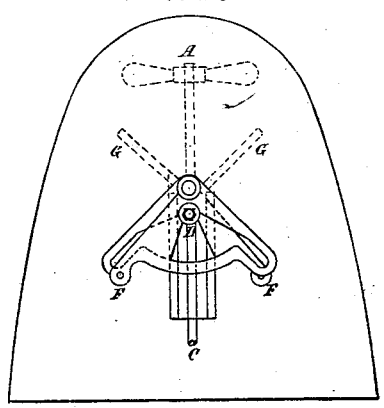
Figure 4:
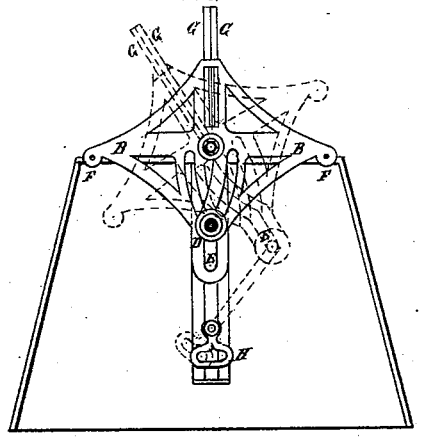
Figure 5:
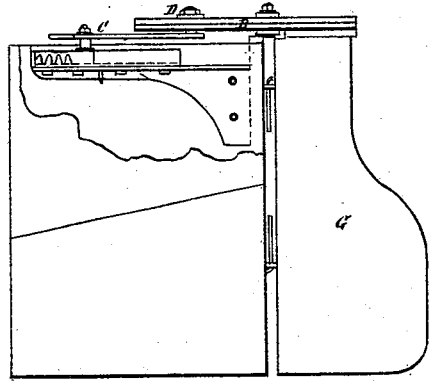
Figure 6:
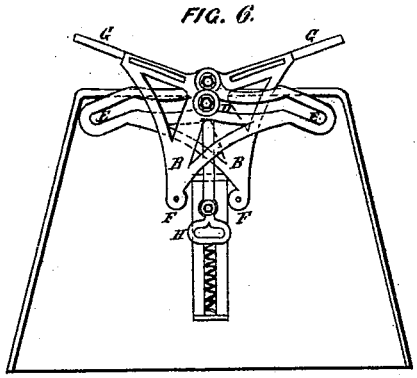
Figure 7:
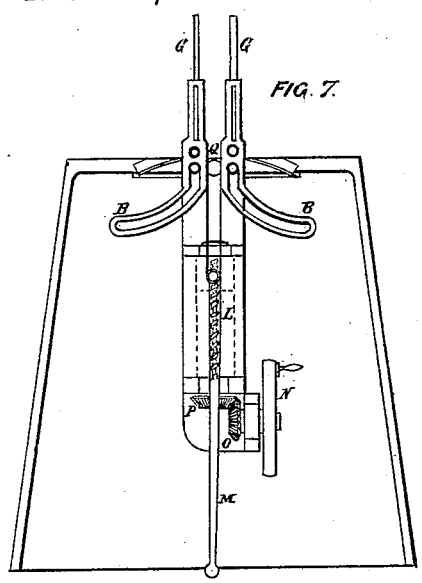
Fig. 7 is a modification of the plan shown in Figs. 4, 5, and 6, the steering being done by the aid of the tiller M, while the position of the studs on the cross-head Q in relation to the slotted levers so as to cause the rudders to diverge is effected by the screw L, which is turned by the hand-wheel N, in connection with a pair of bevel-wheels, O and P.
Figure 8:
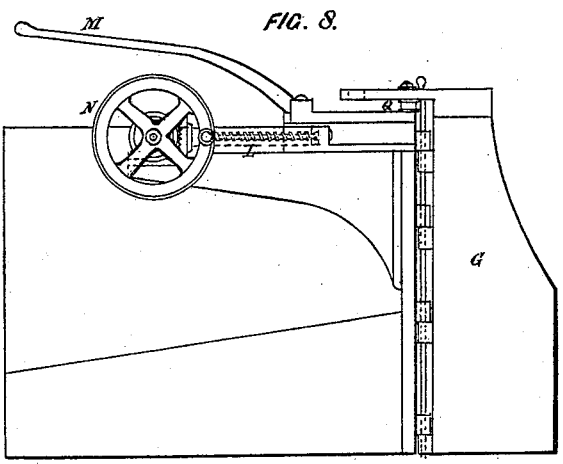
Fig. 8 is a side elevation of Fig. 7.
Figure 9:
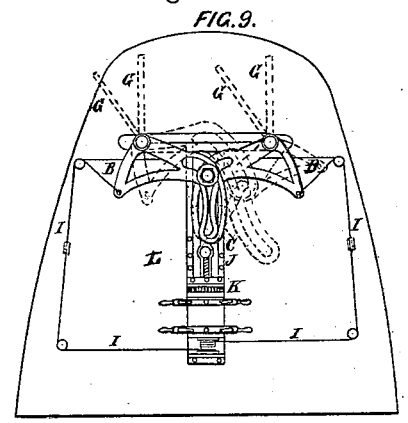

Fig. 9 is a plan in which the rudders G G are placed, one on each side of the propeller, the slotted arms B B being fixed to the rudder-posts, as before. In this case there are two wheels—one to steer with by means of the ropes or chains I I, fastened to the ends of the slotted arms, and the other wheel to operate upon the screw L by the intermediate gearing, K, Fig. 10, in order to change the position of the stud or vertical arm in relation to the slotted arms, precisely in the same way as in the plan herein referred to; only in this case the shaft C, which is an auxiliary tiller, is thrust aft by means of the wheel and screw L, thus causing the rudders to diverge, as is shown in Fig. 11, when it is necessary to check the vessel's passage.

Figure 10:
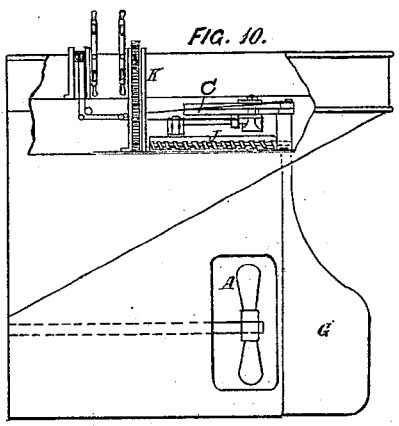
Figure 11:
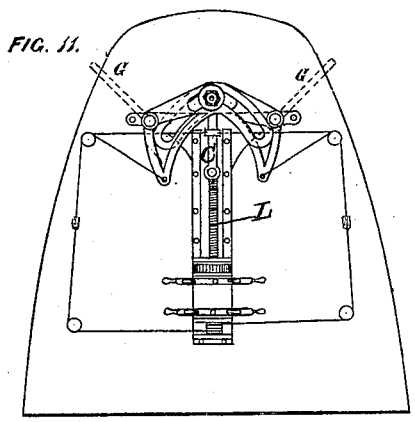

Fig. 10 is a side elevation of Figs. 9 and 11.

Figure 12:
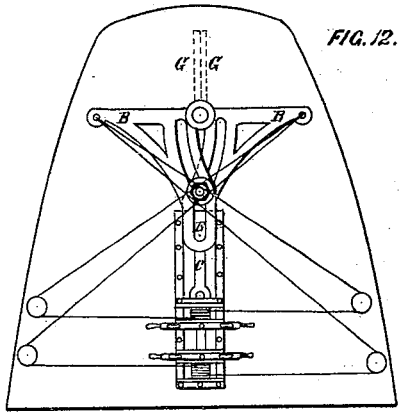

Fig. 12 is a plan wherein the rudders are placed close together and abaft the propeller. In this arrangement there are two wheels employed—one to steer with and the other to give motion to the shaft C for opening or closing the rudders. In Fig. 12 the rudders are shown closed, and in Fig. 14 they are depicted as open or divergent, while Fig. 13 is a side elevation of Figs. 12 and 14.

Figs. 15 and 16 show the relative positions of the rudders to the stern of the vessel when propulsion is effected by the ejection of a stream of water from a slit or narrow orifice, R.

In each of the figures, from 1 to 16, similar letters refer to the same parts.

The second part of my invention relates to the construction of apparatus for steering or checking the speed of vessels when going either ahead or astern; and it consists in furnishing the vessel with two rudders placed one on each side of the propeller or other convenient situation, as before mentioned. The rudder-posts have each fixed to its upper part a peculiarly curved and slotted arm, as shown in Figs. 18 and 20, or are connected to such arms by gearing-wheels, and through the slots in these arms is a vertical stud, that is attached to one end of the tiller, which tiller is sometimes pivoted to a traveling nut worked by a horizontal screw. On moving the front end of the tiller the stud presses against the sides of the slots in the arms, and so directs the rudders to larboard or starboard, as desired. The revolution of the screw or alteration of the position of the nut through the intervention of any suitable power changes the relative position of the stud to the slotted arms, and so causes the rudders to diverge until they stand at or about right angles to their original position. In this way they may be used most effectively not only to check the speed or even stop the ship, but on subsequently causing the vessel to move astern the force of the waves will bring them into such a position as will enable the steersman to guide the vessel by the tiller or ordinary appliances attached thereto.

In order that the last paragraph may be the better understood, Figs. 17 to 24 are added to the drawings attached, Fig. 17 being a side elevation of the steering and checking apparatus, and Fig. 18 a plan of the same. In Figs. 17 and 18, S represents the top line of the base-plate, to which the apparatus is attached. T is a fulcrum fixed to the vessel, and has an eye or loop, through which another loop fixed to the lever U passes, the lever being consequently free to move in any direction. V is a bar, furnished at its front end with a universal joint, to which the lever U is pivoted, and is also pivoted at W to the block X, which slides on the bars $d\ d$. Y represents the slots in the arms $c\ c$. At the other end the bar V is forked, as shown at Z Z, and carries the pin $a$, which passes through the slots $b\ b$ in the two curved and slotted arms $c\ c$. $d\ d$ are two bars, upon which the block X slides and supports the forked part Z of the bar V. $e\ e$ are bracket-arms, to which the slotted arms $c\ c$ are pivoted. $f\ f$ are toothed wheels fixed to the rudder-post heads, and $g\ g$ are toothed wheels fixed to the under side of the slotted arms $c$, while $h\ h$ are intermediate toothed wheels gearing both into $f$ and $g$, and so transmitting the motion of the slotted arms to the rudder-posts. The holes $i\ i$ in the slotted arms are used for the attachment of tackle to open or close the rudders when the other part of the apparatus is out of use.

The action of the apparatus is as follows: The steersman on taking hold of the handle or lever U will move it either to the right or left, as the case may be, when the bar V will also be moved and the forked end of it caused to take an opposite direction. In so doing the pin $a$ will press against the sides of the slots Y in the arms $c\ c$. Consequently the toothed wheels $g\ g$ will partially revolve and communicate their motion through the intervention of the toothed wheels $h\ h$ to the wheels $f\ f$, fixed to the rudder-post heads, both the rudders being thus turned to starboard or larboard, as desired. For the purpose of checking the speed of the vessel the steersman will thrust the lever U backward, thus causing the pin $a$ to so operate upon the arms $c\ c$ as to make both the rudders diverge or turn outward and assume a right or less angle to the keel. The motion for checking just described may be imparted by the steersman thrusting the lever U and bar V backward, or the same effect may be produced by forming the block X into a nut and causing a screw, $j$, Fig. 19, to pass through it and revolve by means of the gearing $k$, connected with any suitable power.

The two last paragraphs have reference to the apparatus as applied to the rudders when the checking of the speed is induced by a thrust of the lever U, bar V, and its accessories; but Figs. 20, 21, 22, and 23 are views of a modification of the same adapted for producing the same effect by a drawing or reversed motion to that previously described. Fig. 20 is a plan of the modified apparatus. Fig. 21 is a plan of the gearing attached to and between the rudder-post heads and the slotted arms. Fig. 22 is a side elevation, and Fig. 23 is an end elevation, of the same. The apparatus in this case may also be operated upon by manual or other suitable power. Thus the lever U and bar V may be drawn forward by the steersman, or they may be caused to assume that position through the agency of a screw and motive power, as shown in Fig. 19, or the bar V may receive the direct action of a piston-rod, $l$, driven from a steam-cylinder, $m$, as shown in Figs. 20 and 22.

Fig. 24 exhibits a view of the under side of the bar $n$, shown in Fig. 23.

Fig. 25 shows a perspective view, and Fig. 26 an end elevation, of another arrangement of the rudders $o$, when applied to a vessel propelled by the ejection of water from a tube, $p$, with a slit or narrow orifice. In each of the figures from 17 to 26 similar letters refer to the same parts.

When it is desired that the rudders shall be placed some distance apart from each other, the motion from the slotted arms may be communicated to the rudders by a modification of the gearing already described, and instead of employing toothed wheels for the purposes herein set forth pitch chains and wheels or friction-gearing may be used.

Manual, steam, hydraulic, or other suitable power may be employed to actuate any or all the moving parts of the apparatus.

Having now described and particularly set forth the nature of this invention, I wish it to be understood that I claim—

1. In a steering and checking apparatus for boats, the combination, with two or more rudders having their post-heads fixed to slotted arms, of the tiller-shaft, having a stud or studs working in the slots of said arms, and by its back-and-forth movement and the construction of said slots effect the adjustment of the rudders to cause them to move together or apart and stand at the desired angle, or stand apart and be adjusted at the desired angle.

2. In steering and checking apparatus for boats, the combination of the lever U, fulcrumed at T, universally-jointed arm V, sliding in boxes X and upon bars $d$, and having the branches Z Z, provided with the pin $a$, levers C, having oblique laterally-extended slots Y, gearing $f g h$, and rudders, substantially as and for the purpose set forth.

THOMAS BRIDGES HEATHORN.

Witnesses:
W. H. BENNETT,
J. L. FEATHERSTONE.